US010043156B2

(12) United States Patent
Kamat et al.

(10) Patent No.: US 10,043,156 B2
(45) Date of Patent: Aug. 7, 2018

(54) SYSTEM AND METHOD FOR CROSS ENTERPRISE COLLABORATION

(71) Applicant: Tata Consultancy Services Limited, Mumbai (IN)

(72) Inventors: Vipul Chandrakant Kamat, Mumbai (IN); Mahesh Kshirsagar, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 184 days.

(21) Appl. No.: 14/872,429

(22) Filed: Oct. 1, 2015

(65) Prior Publication Data
US 2016/0110687 A1 Apr. 21, 2016

(30) Foreign Application Priority Data

Oct. 16, 2014 (IN) .......................... 3310/MUM/2014

(51) Int. Cl.
*G06F 15/16* (2006.01)
*G06F 17/00* (2006.01)
(Continued)

(52) U.S. Cl.
CPC ......... *G06Q 10/103* (2013.01); *G06Q 10/101* (2013.01); *G06Q 30/016* (2013.01); *H04L 67/10* (2013.01)

(58) Field of Classification Search
CPC ............... H04L 29/06; H04L 29/08576; H04L 29/08072; H04L 29/0809; H04L 29/06095;
(Continued)

(56) References Cited

U.S. PATENT DOCUMENTS 6,397,191 B1  5/2002 Notani et al.
7,236,939 B2  6/2007 Chen et al.
(Continued)

FOREIGN PATENT DOCUMENTS

WO    2009/145941 A1   12/2009

OTHER PUBLICATIONS

Paul Grefen et al., "CrossFlow: cross-organizational workflow management in dynamic virtual enterprises", International Journal of Computer Systems Science & Engineering, Sep. 2000, vol. 5, 277-290, CRL Publishing Ltd., (14 pages).
(Continued)

*Primary Examiner* — Mahran Abu Roumi
(74) *Attorney, Agent, or Firm* — Shumaker, Loop & Kendrick, LLP

(57) ABSTRACT

Disclosed is a system and method for cross enterprise collaboration for processing a transaction request. The method includes a mechanism for collaboration to resolve context specific tasks in a structured manner requiring inputs from various stakeholders situated in different enterprises. The metadata associated with each of the activities in the workflow is collected to create a workflow. The method further allows the role-based users to extend the workflow by authoring customized activities and share context specific information and artifacts. The method includes memory efficient version of doubly linked list using one address field for every node to process one or more transaction requests at a given point of time.

9 Claims, 3 Drawing Sheets

(51) Int. Cl.
    *G06Q 10/10* (2012.01)
    *G06Q 30/00* (2012.01)
    *H04L 29/08* (2006.01)
(58) Field of Classification Search
    CPC .............. G06F 9/466; G06F 17/30008; G06F 17/30592; G06Q 10/10; G06Q 30/02
    USPC ........................................................ 709/227
    See application file for complete search history.

(56) References Cited

U.S. PATENT DOCUMENTS

| | | |
|---|---|---|
| 8,918,520 B2 | 12/2014 | Peterson et al. |
| 2006/0282762 A1 | 12/2006 | Diamond et al. |
| 2011/0131174 A1* | 6/2011 | Birch ................ G06F 17/30312 707/607 |
| 2012/0227044 A1* | 9/2012 | Arumugham .......... G06Q 10/06 718/100 |
| 2012/0233206 A1* | 9/2012 | Peterson ................. G06F 9/541 707/769 |
| 2015/0234934 A1* | 8/2015 | Steinmacher-Burow .................. G06F 17/30958 707/800 |
| 2016/0110687 A1* | 4/2016 | Kamat ................ G06Q 10/103 705/301 |

OTHER PUBLICATIONS

BPM Solutions for BPOs, Solutions for business process & content management, (4 pages).
Hamid Reza Motahari Nezhad et al., "A Process- and Policy-aware Cross Enterprise Collaboration Framework for Multisourced Services", Hewlett-Packard Development Company, May 6, 2012, (7 pages), USA.
Role of BPM in BPO, Krawler Blog, Oct. 6, 2009, (1 page).
AccuProcess Business Process Modeler, AccuProcess, 2011, (3 pages).

* cited by examiner

SYSTEM AND METHOD FOR CROSS ENTERPRISE COLLABORATION

CROSS-REFERENCE TO RELATED APPLICATIONS AND PRIORITY

The present application claims priority to Indian Patent Application No. 3310/MUM/2014, filed on Oct. 16, 2014 the entirely of which is hereby incorporated by reference.

TECHNICAL FIELD

The present disclosure generally relates to a cross enterprise collaboration. More particularly, the present disclosure relates to a system and method for collaboration of plurality of enterprises to process a plurality of transactions.

BACKGROUND

Electronic transaction and request applications are based on business partnerships between different enterprises. The basic requirement for a successful processing of request is its capacity to establish a dynamic relationship among a large number of customer and service providers in a distributed computing environment. One important and necessary component to enable the automation is a mechanism that supports and/or facilitates the cooperation and collaboration between different users in different enterprises.

There are several different approaches for supporting a business process based on inter-enterprise business partnerships, where the parties across enterprise boundaries are unlikely to be organized under a centralized coordinator. Further, the collaboration is typically followed by defined rules and protocols with a pre-defined sequence of steps.

In one example, to process any transaction based on a customer request a service provider is required to seek information or clarification from various stakeholders engaged in different roles in varied enterprises. The information sought is context specific with no specific defined steps or procedures. To gain such information a service provider is required to adhere to unstructured serial collaboration. Such collaboration requires a service provider to avoid automation and adopt ad-hoc manual asynchronous mechanisms of phone calls, emails and SMSs to complete the transaction at hand. These conventional means of obtaining information are often time consuming and prone to errors. Such scattered asynchronous mechanism doesn't provide means to record the discussions or method to store the decisions for further review and measurement.

These conventional asynchronous mechanisms of exchanging information are often ineffective at maximizing collaborative efforts. Further, a lot of manual effort is spent on back and forth serial asynchronous collaboration which may have an adverse impact on the measurement of turn-around time of processing a transaction request.

In one example, to affect cross enterprise collaboration, a computer implements a pre-defined set of workflow steps and activities to be performed within the workflow. Such pre-defined workflow steps don't provide opportunity to customize the steps based on particular requirement or context. Typically, the execution of the workflow steps is affected by different instances of same server in different enterprises i.e. multiple process instances which are later synchronized.

SUMMARY

This summary is provided to introduce concepts related to systems and methods for cross enterprise collaboration and the concepts are further described below in the detailed description. This summary is not intended to limit claim scope.

In one implementation, a method for collaboration of plurality of enterprises to process a plurality of transactions is disclosed. The method includes receiving, by a processor, a plurality of requests associated with processing a plurality of transactions between a central enterprise and a plurality of enterprises. The plurality of enterprises are associated with one or more role-based users such that each enterprise, of the plurality of enterprises, has a corresponding role-based user. The method further includes instantiating, by the processor, a plurality of process instances corresponding to processing of one or more transactions of the plurality of transactions. The plurality of process instances instantiated are dependent upon storage space available in a memory, and each process instance is represented in the form of a doubly linked list including a plurality of nodes. A memory address corresponding to each node of the plurality of nodes is an XOR value of memory addressees of a previous node and a next node of each node. A first node of the plurality of nodes represents an enterprise corresponding to which the process instance has been instantiated. An adjacent node of the first node points to a starting memory address of a process workflow associated with the processing of a transaction. The process workflow includes sequence of activities to be performed by the plurality of role-based users. The method further includes swapping at least one process instance of the plurality of instances with at least one new process instance. The at least one process instance is swapped after the processing of the transaction associated with the at least one process instance, and the swapping further facilitates in releasing the storage space being occupied by the doubly liked list corresponding to the at least one process instance. The storage space released is used for processing the transaction associated with the at least one new process instance. The method further includes creating a plurality of web forms corresponding to the plurality of role-based users in such a manner that at least one web form is assigned to at least one role-based user; capturing and transmitting context sensitive information to the at least one role-based user using the at least one web form. The context sensitive information indicates data fields templates for processing the workflow and sharing of relevant artifacts. The method further includes facilitating one or more role-based users to execute the sequence of activities defined as per the workflow to execute plurality of transactions.

In another implementation, a system for providing collaboration of plurality of enterprises to process a plurality of transactions is disclosed. The system includes a processor and a memory coupled to the processor. The processor may execute a plurality of modules stored in the memory. The plurality of modules includes a receiving module, workflow module, a validating module, and a displaying module. The receiving module may receive a plurality of requests associated with processing a plurality of transactions between a central enterprise and a plurality of enterprises. The plurality of enterprises are associated with one or more role-based users such that each enterprise, of the plurality of enterprises, has a corresponding role-based user. Further, workflow module may instantiate a plurality of process instances corresponding to processing of one or more transactions of the plurality of transactions. The plurality of process instances instantiated are dependent upon storage space available in a memory, and each process instance is represented in the form of a doubly linked list including a plurality of nodes. A memory address corresponding to each node of the plurality of nodes is an XOR value of memory addressees of a previous node and a next node of each node. A first node of the plurality of nodes represents an enterprise corresponding to which the process instance has been instantiated. An adjacent node of the first node points to a starting memory address of a process workflow associated with the processing of a transaction, and the process workflow includes sequence of activities to be performed by the plurality of role-based users. The workflow module is further enabled to swap at least one process instance of the plurality of instances with at least one new process instance. The at least one process instance is swapped after the processing of the transaction associated with the at least one process instance, and the swapping further facilitates in releasing the storage space being occupied by the doubly liked list corresponding to the at least one process instance. The storage space released is used for processing the transaction associated with the at least one new process instance. Further, the workflow module creates a plurality of web forms corresponding to the plurality of role-based users in such a manner that at least one web form is assigned to at least one role-based user; capturing and transmitting context sensitive information to the at least one role-based user using the at least one web form, wherein the context sensitive information indicates data fields templates for processing the workflow and sharing of relevant artifacts. The validating module further facilitates one or more role-based users to execute the sequence of activities defined as per the workflow to execute the plurality of transactions.

Yet in another implementation, a non-transitory computer readable medium embodying a program executable in a computing device for providing collaboration of plurality of enterprises to process a plurality of transactions is disclosed. The program may include a program code for receiving a plurality of requests associated with processing a plurality of transactions between a central enterprise and a plurality of enterprises. The plurality of enterprises are associated with one or more role-based users such that each enterprise, of the plurality of enterprises, has a corresponding role-based user. The program may further comprise a program code for instantiating a plurality of process instances corresponding to processing of one or more transactions of the plurality of transactions. The plurality of process instances instantiated are dependent upon storage space available in a memory, and each process instance is represented in form of a doubly linked list including a plurality of nodes. A memory address corresponding to each node of the plurality of nodes is an XOR value of memory address of a previous node and a next node of each node. A first node of the plurality of nodes represents an enterprise corresponding to which the process instance has been instantiated. An adjacent node of the first node points to a starting memory address of a process workflow associated with the processing of a transaction, and the process workflow includes sequence of activities to be performed by the plurality of role-based users. The program may further include a program code for swapping at least one process instance of the plurality of instances with at least one new process instance. At least one process instance is swapped after the processing of the transaction associated with the at least one process instance, and the swapping further facilitates in releasing the storage space being occupied by the doubly liked list corresponding to the at least one process instance. The storage space released is used for processing the transaction associated with the at least one new process instance. The program may further includes a program code for creating a plurality of web forms corresponding to the plurality of role-based users in such a manner that at least one web form is assigned to at least one role-based user; capturing and transmitting context sensitive information to the at least one role-based user using the at least one web form The context sensitive information indicates data fields templates for processing the workflow and sharing of relevant artifacts. The program may further include a program code for facilitating one or more role-based users to execute the sequence of activities defined as per the workflow to execute the plurality of transactions.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. The present disclosure relates to systems and methods to enable cross enterprise collaboration for processing a request for transaction. The present disclosure discloses an efficient mechanism for collaboration to resolve a context specific task/activity in a structured manner requiring inputs from various stakeholders situated in different enterprises. The request may comprise diverse category of transaction request received by a central enterprise. Such request may be concurrently received for a multiplicity of domains.

Subsequent to receiving the transaction request, the service provider associated with the central enterprise identifies the activities needed and stakeholders involved in cross enterprise collaboration. The service provider also defines the time period or constraint for completion of such activities and to track to closure of the transaction request received. The disclosure provides a workflow module to permit addition of relevant activities and possibility to bring ad-hoc and dynamic changes to executing the workflows.

An embodiment of the disclosure provides for metadata based activation and combination of various set of activities to allow structured or unstructured collaboration across multiple stakeholders in the context of a transaction. An embodiment of the disclosure allows for creation and usage of customized web form fields to be created for capturing and transmitting context sensitive information to relevant stakeholders as per workflow defined while also facilitating artifacts to be shared and reused across the stakeholders for completion of relevant actions towards activity completion. Further, the disclosure also allows for defining the workflow as per the type of enterprise and tagging of customized status for each workflow step.

An embodiment of the disclosure provides for doubly linked lists in memory. As per the disclosure a memory efficient version of doubly linked list is created using only one space for address field with every node unlike an ordinary doubly linked list which requires space for two address fields.

While aspects of described system and method for processing a transaction may be implemented in any number of different computing systems, environments, and/or configurations, the embodiments are described in the context of the following exemplary system.

Figure 1:
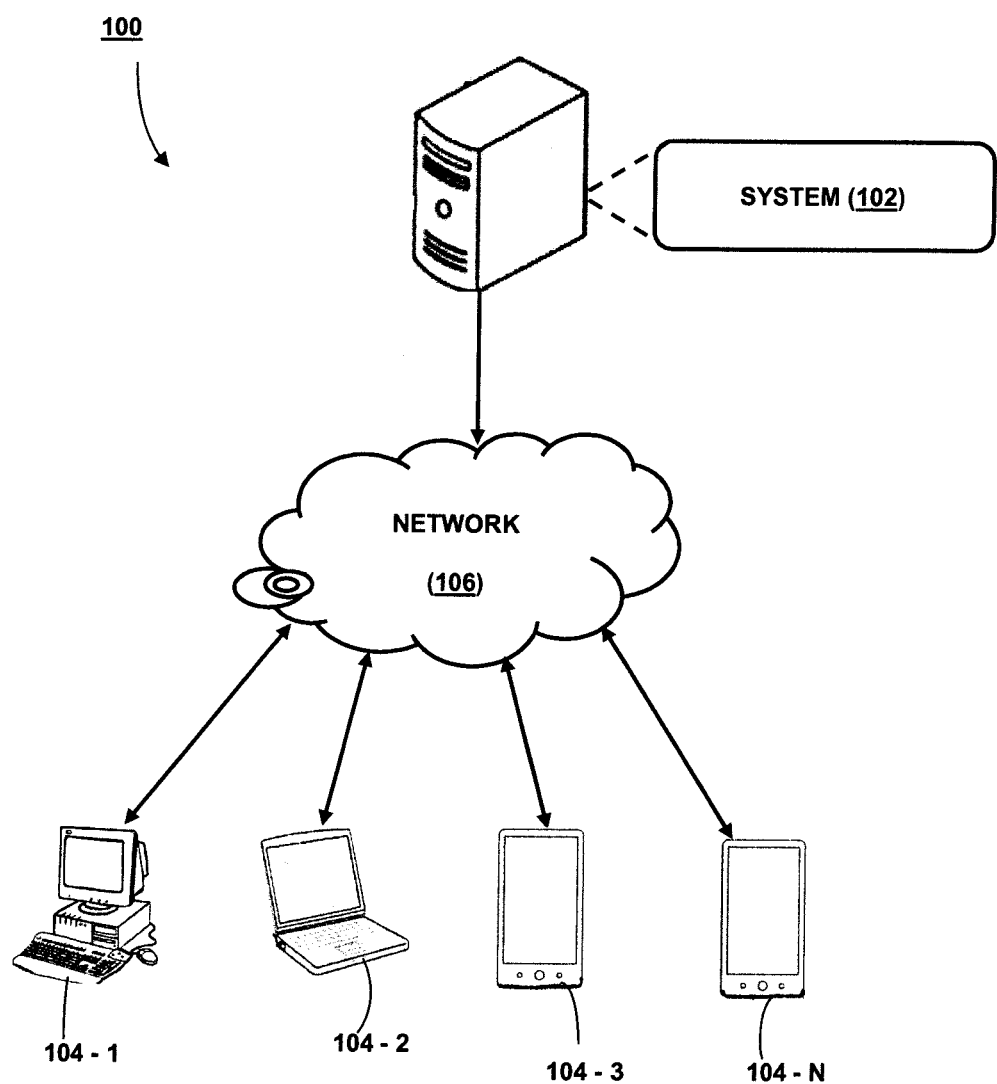
FIG. 1 illustrates a network implementation of a system for providing cross enterprise collaboration, in accordance with an embodiment of the present disclosure.

Referring now to FIG. 1, a network implementation 100 of a system 102 for providing cross enterprise collaboration for processing a transaction is illustrated, in accordance with an embodiment of the present disclosure. The system 102 may receive an input data associated with the transaction. Based on the input data and pre-defined rules the service provider associated with the central enterprise shall define a workflow steps based on the various set of activities. Further, based on the transaction request the workflow is routed to define a sequence of the process to be executed for the processing of the transaction. Role-based users may be identified from a plurality of enterprises. The system 102 may instantiate a plurality of process instances corresponding to processing of one or more transactions of the plurality of transactions, wherein the plurality of process instances instantiated are dependent upon storage space available in a memory. Each process instance in the system 102 is represented in form of a doubly linked list comprising a plurality of nodes and at least one process instance of the plurality of instances is swapped with at least one new process instance for effective management of storage space. The system 102 may process the transaction based on the identified workflow between the plurality of enterprises.

Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2, 104-3, 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
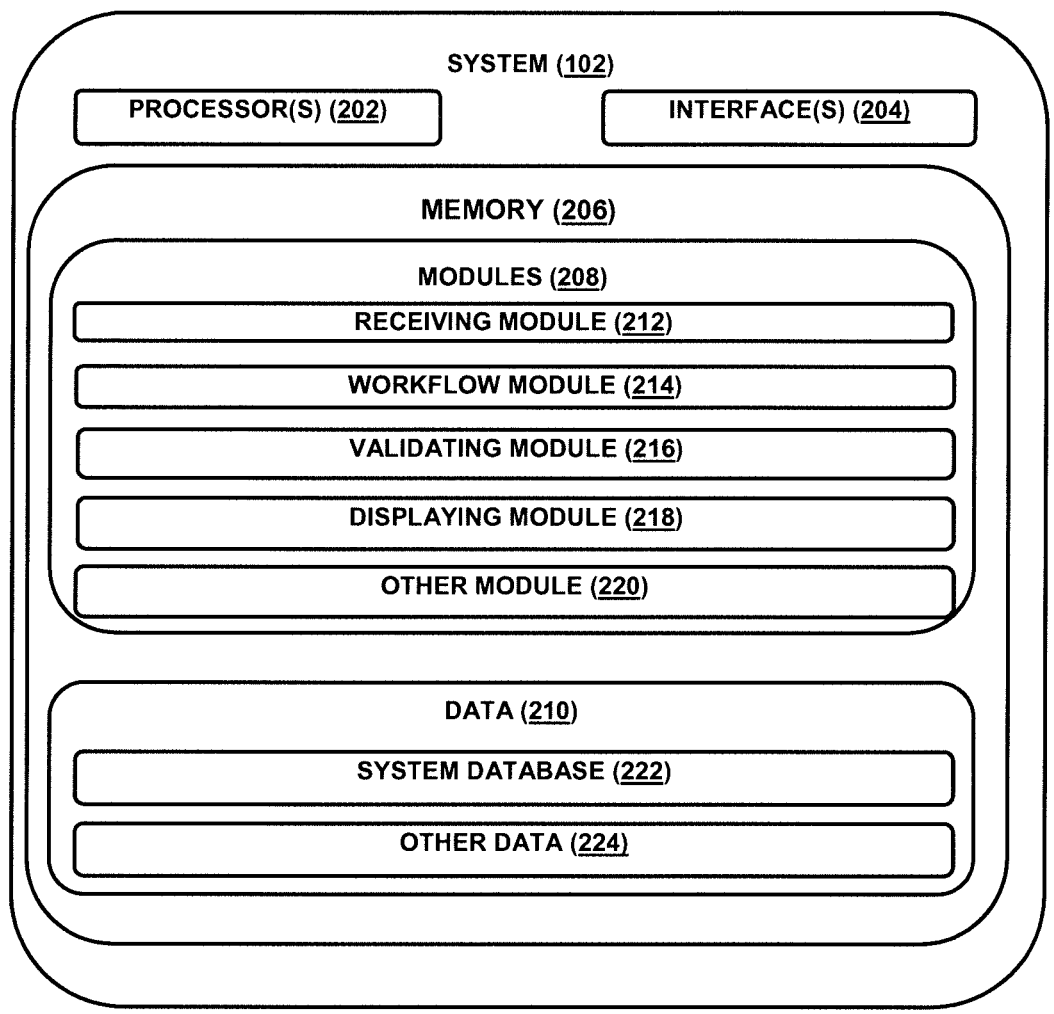
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a receiving module 212, workflow module 214, validating module 216, displaying module 218 and other modules 220. The other modules 220 may include programs or coded instructions that supplement applications and functions of the system 102.

The system data 210, among other things, serves as a repository for storing data processed, received, and generated by one or more of the modules 208. The data 210 may also include a system database 222 and other data 224. The other data 224 may include data generated as a result of the execution of one or more modules in the other module 220.

Figure 3:
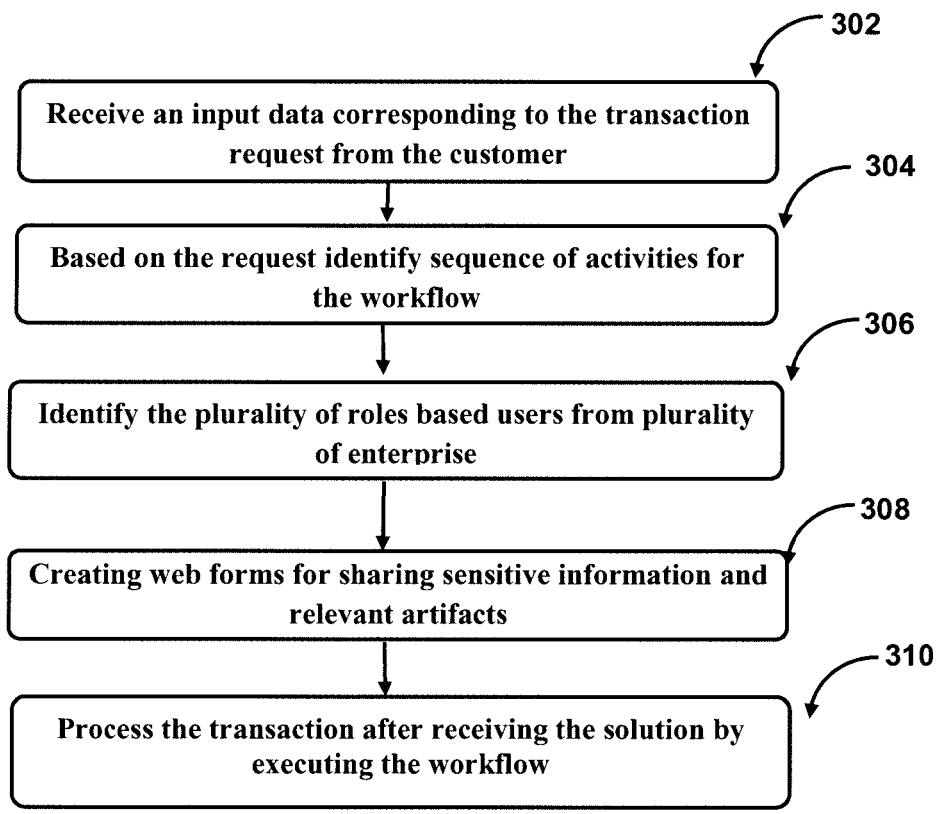
FIG. 3 illustrates working of the collaboration process in detail, in accordance with an embodiment of the present disclosure.

In one implementation, at first for a transaction, a customer may use the service provider device 104 to access the system 102 via the I/O interface 204. The customer may register themselves using the I/O interface 204 in order to use the system 102. An exemplary depiction of the working of the system 102 is shown in FIG. 3. The system 102 may be used for collaboration of a plurality of enterprises to process a plurality of transactions. In order to establish collaboration of a plurality of enterprises, the system 102, at first, receives a plurality of requests associated with processing a plurality of transactions. Specifically, in the present implementation, the plurality of requests is received by the receiving module 212.

Referring to FIG. 3, the transaction may begin when a customer raises a request for transaction. In order to process the associated/requested transaction, the system 102, at first, may receive an input data from the customer. Specifically, in the present implementation, the input data may be received by the receiving module 212. Further the input data may be stored in the system database 228. The input data may be associated with the request for transaction.

In order to receive the above input data, the receiving module 212 may receive the information by presenting a form to the customer. The receiving module may further receive a user input including a data fields elected from a set of data fields. It is to be understood that the customer may enquire in a number of ways. For example, the customer may contact the service provider via telephone, written correspondence, or electronic communications such as, e-mail or Interactive Voice Response (IVR) system. The service provider may, in turn, communicate with the customer via the system 102. In one example, the customer may raise a request for transaction relating to Import letter of credit issuance, advising of letter of credit, employee claim settlement and employee payroll adjustment etc.

In one scenario, a service provider may receive several requests for transaction from various customers requiring unique activities to be performed under different workflows and interaction with role based users of various enterprises.

After receiving the input data from the customer, the system 102 may employ the workflow module 214 to create a workflow based upon the input data and the identified activities to process the transaction. Based on the category of the transaction the service provider may select activities to identify a solution using the system 102. Based on the input data, the user may employ the workflow module 214 to organize the activities to create the workflow. The workflow module 214 permits customization, configuration, activation, and execution of different category of workflows and tracking capabilities against executed workflow and associated activities. Each activity represents a component from metadata for the steps in a workflow process. The activity is the basic unit of execution in the workflow model and can be configured by the service provider via configuration requiring no programming. The disclosure allows metadata based activation and combination of various features to allow structured or unstructured collaboration across multiple enterprises.

On identifying the activities of the workflow, the service provider further categorizes the stakeholders/role-based users associated with a plurality of enterprise(s). The workflow module further allows the service provider, herein the central enterprise, to customize and execute dynamic changes to executing workflow to organize for variety of enterprises at a given point of time. The disclosure supports creation and modification of the workflow at run-time allowing the user/service provider to add/delete activities of the workflow as per the need and requirement of the customer request.

The workflow module provides facility to the service provider to define permission for the stakeholders/role based users associated with a plurality of enterprise. The workflow module provides authentication mechanism and flexibility to the service provider to interface with existing corporate directories/LDAP (Lightweight Directory Access Protocol) of various enterprises and further enable the user to re-use the credential date of the role-based users.

According to embodiments of the present disclosure, the disclosure further allows role-based users to annotate the assigned activity by means of comments, suggestions, information, or relevant artifacts. The disclosure further allows for creation and usage of customized web form fields to capture and transmit context sensitive information to relevant role-based users. The captured information and artifacts are stored in the memory, which may be further shared and reused by the service provider for completion of relevant actions for a different transaction received from same or different customer. Further, the role-based users can advance the assigned activities with users not involved in the completion of activities as per the defined workflow. Such users can be involved for the purpose of discussion or sharing of information relevant to the activity in hand.

Further, the workflow module allows workflow instantiation by executing a plurality of activities. At a given point of time the service provider may instantiate plurality of workflows to process transaction requests received from one or more customers requiring collaboration of variety of enterprise to arrive at a solution. A transaction ID is designated to every customized process workflow for identification.

In one embodiment, the activities of the workflow are represented in the form of a loosely coupled doubly linked list. The doubly linked list is dynamically instantiated by the system after assessing at run-time the total number of instances required in-memory vis-a-vis the available memory. The doubly linked list includes of plurality of nodes where each node is linked by a single link field as XOR linking. The disclosure discloses a memory efficient system, which creates only one space for an address field with every node. The linked list utilizes XOR operation to save storage space for one address field. Each node instead of storing actual memory address stores the XOR of addresses of previous and next nodes thus, contributing to memory storage efficiency. The released storage space is used for processing the transaction associated with the at least one new process instance received from one or more customers.

The system 102 further includes the displaying module 218. The displaying module 218 displays the plurality of process workflow(s) executed for a plurality of enterprises and view interactions between various role-based users from the plurality of enterprise, social collaboration, content management and management of turn-around-time and audit trails. The web-based interface/dashboard presents a flexible user interface to allow a rule designer to create and edit rules without altering the rules and workflow execution.

The system 102 further includes the validating module 216. The validating module 216 allows performing root cause analysis based on the captured data as part of the execution of the workflow. The system further allows for rules driven setting up of triggers to highlight and notify the relevant/identified users Service Level Agreement (SLA)/Turn around Time (TAT) breaches. Every activity of the workflow can be specified an SLA limit and alert feature. The system enables the user to receive and access the alerts/notifications/announcements across plurality of enterprise irrespective of the geographical location via computer, mobile, tablet or any hand-held device or cloud deployment. Such notification ensures visibility and transparent tracking of workflow progress and/or delay in activity completion. Further, audit trails and execution logs can be maintained to monitor the progress of the workflow.

According to one embodiment of the present disclosure, the request for transaction may be received for management of software requirements requiring inputs or activity completion from various role based users from plurality of enterprises. The disclosure provides role based users to annotate relevant information and artifacts for review and understanding with the appropriate stakeholders. The role based users may further provide clarification and/or necessary changes or further details of functionality required in detail with additional supporting documents against each section or sub-section of the requirement specification document. The information and documents can be accessed, shared and re-used by multiple stakeholders. Such stakeholders may be technical analyst, business analyst, business subject matter expert and solution architects required for the transaction. The disclosure provides for collaborative analysis and review of the relevant information and documents by multiple stakeholders. Further, the validation module 216 allows performing root cause analysis based on the audit trails of the collaboration to process a transaction.

Although, implementations for methods and systems for providing cross-enterprise collaboration have been described in language specific to structural features and/or methods, it is to be understood that the appended claims are not necessarily limited to the specific features or methods described. Rather, the specific features and methods are disclosed as examples of implementations for providing cross-enterprise collaboration to process plurality of transactions.

We claim:

1. A method for collaboration of a plurality of enterprises to process a plurality of transactions, the method comprising:

receiving, by a processor, a plurality of requests associated with processing a plurality of transactions between a central enterprise and a plurality of enterprises, wherein the plurality of enterprises are associated with one or more role-based users such that each enterprise, of the plurality of enterprises, has a corresponding role-based user;

instantiating, by the processor, a plurality of process instances corresponding to processing of one or more transactions of the plurality of transactions, wherein the plurality of process instances instantiated are dependent upon storage space available in a memory, wherein each process instance is represented in a doubly linked list comprising a plurality of nodes, wherein a memory address corresponding to each node of the plurality of nodes is an XOR value of memory addressees of a previous node and a next node of each node, and wherein a first node of the plurality of nodes represents an enterprise corresponding to which the process instance has been instantiated, and wherein an adjacent node of the first node points to a starting memory address of a process workflow associated with the processing of a transaction, and wherein the process workflow comprises a sequence of activities to be performed by the plurality of role-based users and wherein the process workflow is determined as per metadata definition to allow structured or unstructured collaboration across plurality of role-based users, and wherein the process workflow is modified in run-time allowing addition or deletion of activities as per the need and requirement of the request, wherein the collaboration of the plurality of enterprises allows mapping of customized status mapped to each workflow and sequence of activities based on type of enterprise and wherein a mapping of process workflow assists in process specific details and tracks closure of sequence of activities for the plurality of transactions;

swapping at least one process instance of the plurality of instances with at least one new process instance, wherein the at least one process instance is swapped after the processing of the transaction associated with the at least one process instance, and wherein the swapping further facilitates in releasing the storage space being occupied by the doubly linked list corresponding to the at least one process instance, and wherein the storage space released is used for processing the transaction associated with the at least one new process instance;

creating a plurality of web forms corresponding to the plurality of role-based users in such a manner that at least one web form is assigned to at least one role-based user; capturing and transmitting context sensitive information to the at least one role-based user using the at least one web form, wherein the context sensitive information indicates data fields templates for processing the workflow and sharing of relevant artifacts;

facilitating one or more role-based users to execute the sequence of activities defined as workflow to execute the plurality of transactions and to carry out root cause analysis based on data captured as part of execution of the workflow;

facilitating setting up of triggers to highlight and notify at least one of identified users service level agreement and turnaround time breaches, wherein each activity of the workflow is specified with a service level agreement (SLA) limit and an alert feature, wherein the triggers are rule driven; and enabling the role based user to receive and access at least one of alerts, notifications, and announcements across the plurality of enterprises in a plurality of geographical locations.

2. The method of claim 1, wherein structured or unstructured collaboration allows access via computer, mobile, tablet or any hand-held device or cloud deployment.

3. The method of claim 1 further comprises a web-based dashboard operative to display the plurality of process workflow executed for a plurality of enterprises, wherein such dashboard is used to view interactions between various role-based users from the plurality of enterprise, social collaboration and management of turn-around-time and audit trails.

4. The method of claim 1, wherein a web-based dashboard permits a rule designer to create and edit rules within a predetermined form by textually entering rules in accordance with rule syntax.

5. The method of claim 1, wherein a rules driven engine allows for setting up triggers to highlight an event to a central enterprise and the plurality of enterprises selected from the sequence of activities consisting of: a new message, a read message, a filed message, a periodic event, a timed event, an application startup, an application exiting, a button event, an inter-application communication event and identified SLA breach.

6. A system for collaboration of a plurality of enterprises to process a plurality of transactions, the system comprising a processor;

a memory coupled to the processor, wherein the processor executes a plurality of modules stored in the memory, and wherein the plurality of modules comprising:

a receiving module to receive a plurality of requests associated with processing a plurality of transactions between a central enterprise and a plurality of enterprises, wherein the plurality of enterprises are associated with one or more role-based users such that each enterprise, of the plurality of enterprises, has a corresponding role-based user;

a workflow module to instantiate a plurality of process instances corresponding to processing of one or more transactions of the plurality of transactions, wherein the plurality of process instances instantiated are dependent upon storage space available in a memory, wherein each process instance is represented in a doubly linked list comprising a plurality of nodes, wherein a memory address corresponding to each node of the plurality of nodes is an XOR value of memory addressees of a previous node and a next node of each node, and wherein a first node of the plurality of nodes represents an enterprise corresponding to which the process instance has been instantiated, and wherein an adjacent node of the first node points to a starting memory address of a process workflow associated with the processing of a transaction, and wherein the process workflow comprises a sequence of activities to be performed by the plurality of role-based users, and wherein the process workflow is determined as per metadata definition to allow structured or unstructured collaboration across plurality of role-based users, and wherein the process workflow is modified in run-time allowing addition or deletion of activities as per the need and requirement of the request, wherein the collaboration of the plurality of enterprises allows mapping of customized status mapped to each workflow and sequence of activities based on type of enterprise and wherein a mapping of process workflow assists in process specific details and tracks closure of sequence of activities for the plurality of transactions;

swap at least one process instance of the plurality of instances with at least one new process instance, wherein the at least one process instance is swapped after the processing of the transaction associated with the at least one process instance, and wherein the swapping further facilitates in releasing the storage space being occupied by the doubly linked list corresponding to the at least one process instance, and wherein the storage space released is used for processing the transaction associated with the at least one new process instance, and create a plurality of web forms corresponding to the plurality of role-based users in such a manner that at least one web form is assigned to at least one role-based user; capturing and transmitting context sensitive information to the at least one role-based user using the at least one web form, wherein the context sensitive information indicates data fields templates for processing the workflow and sharing of relevant artifacts;

a validating module to facilitate one or more role-based users to execute the sequence of activities defined as workflow to execute the plurality of transactions and to carry out root cause analysis based on data captured as part of execution of the workflow;

to facilitate setting up of triggers to highlight and notify at least one of identified users service level agreement and turnaround time breaches, wherein each activity of the workflow is specified with a service level agreement (SLA) limit and an alert feature, wherein the triggers are rule driven; and to enable the role based user to receive and access at least one of alerts, notifications, and announcements across the plurality of enterprises in a plurality of geographical locations.

7. The system of claim 6, wherein the collaboration of the plurality of enterprises allows mapping of a customized status mapped to each workflow and sequence of activities based on type of enterprise.

8. The system of claim 6, further comprising a display module to provide web-based dashboard operative for displaying the plurality of process workflow executed for a plurality of enterprises, wherein the web-based dashboard is used to view interactions between various role-based users from the plurality of enterprise, social collaboration, and management of turn-around-time and audit trails.

9. A non-transitory computer readable medium embodying a program executable in a computing device for providing collaboration of plurality of enterprises to process a plurality of transactions, the program comprising:

a program code for receiving a plurality of requests associated with processing a plurality of transactions between a central enterprise and a plurality of enterprises, wherein the plurality of enterprises are associated with one or more role-based users such that each enterprise, of the plurality of enterprises, has a corresponding role-based user;

a program code instantiating a plurality of process instances corresponding to processing of one or more transactions of the plurality of transactions, wherein the plurality of process instances instantiated are dependent upon storage space available in a memory, wherein each process instance is represented in a doubly linked list comprising a plurality of nodes, wherein a memory address corresponding to each node of the plurality of nodes is an XOR value of memory address of a previous node and a next node of each node, and wherein a first node of the plurality of nodes represents an enterprise corresponding to which the process instance has been instantiated, and wherein an adjacent node of the first node points to a starting memory address of a process workflow associated with the processing of a transaction, and wherein the process workflow comprises a sequence of activities to be performed by the plurality of role-based users, and wherein the process workflow is determined as per metadata definition to allow structured or unstructured collaboration across plurality of role-based users, and wherein the process workflow is modified in run-time allowing addition or deletion of activities as per the need and requirement of the request, wherein the collaboration of the plurality of enterprises allows mapping of customized status mapped to each workflow and sequence of activities based on type of enterprise and wherein a mapping of process workflow assists in process specific details and tracks closure of sequence of activities for the plurality of transactions;

a program code for swapping at least one process instance of the plurality of instances with at least one new process instance, wherein the at least one process instance is swapped after the processing of the transaction associated with the at least one process instance, and wherein the swapping further facilitates in releasing the storage space being occupied by the doubly linked list corresponding to the at least one process instance, and wherein the storage space released is used for processing the transaction associated with the at least one new process instance;

a program code for creating a plurality of web forms corresponding to the plurality of role-based users in such a manner that at least one web form is assigned to at least one role-based user; capturing and transmitting context sensitive information to the at least one role-based user using the at least one web form, wherein the context sensitive information indicates data fields templates for processing the workflow and sharing of relevant artifacts;

a program code for facilitating one or more role-based users to execute the sequence of activities defined as workflow to execute the plurality of transactions and to carry out root cause analysis based on data captured as part of execution of the workflow;

a program code for facilitating setting up of triggers to highlight and notify at least one of identified users service level agreement and turnaround time breaches, wherein each activity of the workflow is specified an service level agreement (SLA) limit and an alert feature, wherein the triggers are rule driven; and a program code for enabling the role based user to receive and access at least one of alerts, notifications, and announcements across the plurality of enterprises in a plurality of geographical locations.

* * * * *